United States Patent
Remington et al.

(10) Patent No.: US 6,681,152 B1
(45) Date of Patent: Jan. 20, 2004

(54) PREDICTIVE ACTIVE COMPENSATION SYSTEMS

(75) Inventors: Paul J. Remington, Sudbury, MA (US); John Scott Knight, Stonington, CT (US); Bruce Stuart Murray, Winchester, MA (US)

(73) Assignee: BBNT Solutions LLC, Cambridge, MA (US)

( * ) Notice: Subject to any disclaimer, the term of this patent is extended or adjusted under 35 U.S.C. 154(b) by 162 days.

(21) Appl. No.: 09/927,749

(22) Filed: Aug. 10, 2001

Related U.S. Application Data

(60) Provisional application No. 60/250,575, filed on Nov. 30, 2000.

(51) Int. Cl.[7] ................................................. G01M 1/38
(52) U.S. Cl. ......................................... 700/280; 700/28
(58) Field of Search .............................. 700/280, 42, 28, 700/33, 45; 188/378–381

(56) References Cited

U.S. PATENT DOCUMENTS

| | | | | |
|---|---|---|---|---|
| 5,660,255 A | * | 8/1997 | Schubert et al. ............ 188/378 |
| 5,899,443 A | * | 5/1999 | Su .......................... 267/140.14 |
| 6,036,162 A | * | 3/2000 | Hayashi ...................... 248/550 |
| 6,128,552 A | * | 10/2000 | Iwai et al. ................... 700/280 |
| 6,182,596 B1 | * | 2/2001 | Johnson ....................... 114/284 |
| 6,378,672 B1 | * | 4/2002 | Wakui ......................... 188/378 |

* cited by examiner

*Primary Examiner*—Leo Picard
*Assistant Examiner*—Zoila Cabrera
(74) *Attorney, Agent, or Firm*—Leonard Charles Suchtya; Joel Wall

(57) ABSTRACT

There is disclosed multiple embodiments of a predictive active compensation system for dampening vibration in an optimum manner employing feedback control wherein stiffness of dampening material is adjusted on a continuous and dynamic basis to ensure that relative displacement between vibrating machine or object and its foundation does not exceed particular limits including limits preventing impact between object and foundation. In these disclosed systems and methodologies of the present invention the foundation may also be subjected to movement. Further disclosed are computer plots of mathematical models on which embodiments of the present invention are based, thereby demonstrating efficacy of the present invention.

16 Claims, 9 Drawing Sheets

PREDICTIVE ACTIVE COMPENSATION SYSTEMS

CROSS-REFERENCE TO RELATED APPLICATIONS

The instant application claims the benefit of U.S. Provisional Application No. 60/250,575, filed Nov. 30, 2000, which is hereby incorporated herein by reference in its entirety.

STATEMENT REGARDING FEDERALLY SPONSORED RESEARCH OR DEVELOPMENT

This invention was made with Government support under Contract No. N00024-95-C-2103, awarded by NAVSEA. The Government has certain rights in this invention.

FIELD OF THE INVENTION

The present invention relates generally to mechanical displacement or vibration compensation systems, and, more particularly relates to such systems employing feedback control.

BACKGROUND OF THE INVENTION

In any mechanical system involving motion there is a potential for excessive displacement or vibration relative to limits designed into such system. For example, as any human traveler has observed while on movable systems such as spacecraft, aircraft, seacraft, motor vehicles, elevators etc., excessive displacement or vibration not only can contribute to one's fatigue and discomfort, but, if such limits are exceeded where impact occurs, can also pose serious safety risks derived from potential damage to the system's structure. These transportation systems are not the only class of mechanical systems where excessive vibration can be problematic. There are other classes of mechanical systems having potential for excessive displacement or vibration such as, for example, machinery support systems used in non-transportation applications such as factory or manufacturing environments, although certain of such machinery support systems can also be employed in the aforementioned transportation applications.

Machinery support systems are typically designed to provide vibration isolation between the machinery and its foundation so as to prevent transmission of machinery forces into the foundation where they can generate vibration and sound. This design requirement conflicts with the additional need to maintain a specified clearance within the mount. Maintaining clearances within the mount is necessary so as to minimize likelihood of the machine coming into hard contact with its foundation. The specified clearance is likely to be exceeded when the mount foundation is subjected to low frequency high amplitude displacements, such as might occur in a ship in heavy seas, a submarine during maneuvers, a land vehicle on a rough road, an aircraft during maneuvering or an aircraft flying in turbulence. Hard contact will, in most if not all circumstances, adversely affect vibration isolation performance of the mount. In addition, impact between mount and foundation could result in damage to the machine or its foundation, posing potentially serious safety risks to passengers and others aboard transportation systems utilizing any such mount/foundation vibration isolation system, as noted above.

To maintain clearance, a compensation system is often employed in conjunction with or as part of the mounting system. In essence, prior art compensation systems seek to stiffen the mount, because a stiff mount (in contrast with a compliant mount) will allow for little relative motion between machine and foundation which reduces likelihood of impact therebetween. However, the stiffer the mount is made, the worse the isolation becomes. An effective vibration isolation system performs best if the mount is very compliant which allows for significant motion between the machine and its foundation. In a particular circumstance, if foundation motions are relatively severe and clearance requirements are relatively stringent so that only relatively small displacements between machine and foundation are allowed, then a fixed prior-art compensation system could impair vibration isolation performance of the mounting system, because the compensation system will, effectively, have to make the mount much stiffer than it would otherwise have made it.

Compensation systems in the prior art are typically linear feedback control systems which feedback deflection (displacement), velocity or acceleration across the mount and generate forces across the mount to maintain a minimum clearance. Since these systems cannot adjust themselves to their environment (foundation motion) they must be designed for worst case environment which can lead to a larger than necessary adverse impact on vibration isolation performance when the environment is not worst case.

What is needed, and what the prior art does not offer, is a dynamic compensation system which can control the degree of vibration isolation as a function of changing environment to ensure that impact does not occur, while, at the same time, maximizing vibration isolation. The present invention offers such a welcome solution to the problems and shortcomings of the prior art.

SUMMARY OF THE INVENTION

Embodiments of the present invention relate to systems for controlling motion of a first object movably mounted within a second object. In such systems, stiffness of the movably mounted structure supporting the first object is established. An allowable maximum range of motion of the first object relative to the second object is established. Displacement or deflection of the first object relative to the second object is continuously estimated. And, the stiffness is adjusted in a manner to prevent the maximum displacement from exceeding the allowable maximum range of motion, in response to the maximum displacement being estimated to be beyond said allowable maximum range.

Further features of these embodiments of the present invention include the first object as a ship's deck and the second object as a ship's hull, and where the stiffness is established through a pneumatic system. In these further features, acceleration sensors measure hull acceleration, relative displacement sensors measure deck to hull relative displacement, and relative velocity sensors measure deck to hull relative velocity. These measurements are used in a feedback loop control system to continuously calculate estimated values of maximum displacement and to vary pressure of the pneumatic system to compensate accordingly.

In another aspect, the present invention is a new approach for actively maintaining clearances in a vibration isolation mount with minimum impact on vibration isolation performance when the mount foundation is subjected to large amplitude low frequency vibration. The approach uses measurements of acceleration of mount foundation, displacement across the mount and velocity across the mount to predict time history of relative displacement between mount and foundation. The prediction is continuously updated to account for any changes that occur in foundation acceleration. If predicted relative displacement exceeds the maximum allowable value, the control system increases mount stiffness until the prediction indicates that relative displacement will be less than the maximum allowable. In the case of an air mount, the pumping of air directly into the mount employing an air cylinder or hydraulic cylinder or other vibration absorbing mechanism can increase stiffness. For other types of mounting systems, e.g., a metal spring or an elastomeric mount, a separate actuator is provided such as an electromagnetic actuator or an electrodynamic actuator, to be used with either such spring or such mount alone, or possibly together in combination with the aforementioned air cylinder, hydraulic cylinder or other vibration-absorbing mechanism or entity.

It is thus a general object of the present invention to provide an improved mechanical displacement or vibration compensation system employing feedback control.

It is a further object of the present invention to provide such compensation system having such control which continuously estimates maximum displacement and adjusts stiffness of the system to maintain maximum displacement within an allowable maximum range.

It is thus advantageous to employ embodiments of the present invention in mechanical systems involving motion. This Predictive Active Compensation Systems (PACS) approach minimizes the stiffening effect by stiffening the mount only as much as is needed to ensure that maximum allowable relative displacement between machine and foundation will not be exceeded. Should foundation acceleration decrease, stiffness will be reduced accordingly. This approach offers the possibility of using much more compliant mounting systems than could heretofore be imagined because of the possibility of their bottoming out when operating in any real environment. PACS, when operating with the environment in a quiescent state, offer substantial improvement in vibration isolation performance. These systems thus offer many advantages as they are employable in a wide variety of applications where vastly improved noise and vibration reductions are needed.

In other words, an advantage of this approach is that the mount is made only as stiff as necessary to ensure that the machine to foundation relative displacements do not exceed a maximum allowable value. Since the mount stiffness is kept as small as possible, the mounting system will provide the best possible vibration isolation performance consistent with maintaining the desired mount clearances in whatever environment it encounters. This is especially important in quiescent environments (i.e. conditions under which little or no change in mount clearance occurs) where mount stiffness can therefore be kept very low (low stiffness is equivalent to highly compliant, and high stiffness is equivalent to almost non-compliant). The concept offers the possibility of using mounting system with much lower stiffness and much better vibration isolation performance than have heretofore been contemplated because of the tendency of these very compliant mounting systems to bottom out.

Further objects and advantages of the present invention will be appreciated after reviewing the detailed description of the preferred embodiments hereinbelow in combination with the appended drawings wherein:

DETAILED DESCRIPTION OF THE PREFERRED EMBODIMENT

Figure 1:
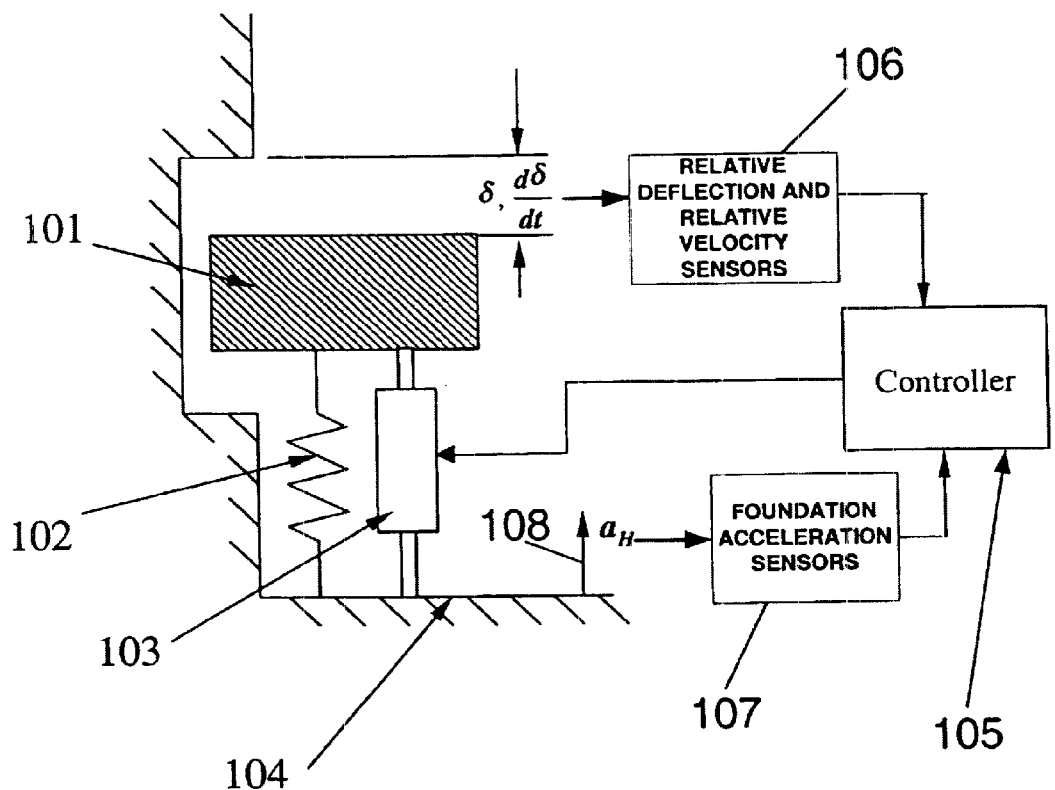
FIG. 1 is a schematic diagram of an embodiment of the present invention.

Referring to FIG. 1 a schematic diagram of an embodiment of the present invention is presented. In general, machine 101 is isolated from foundation 104 by isolation mount 102. Actuator 103 controls the position of machine 101 in response to signals provided by controller 105. Controller 105 may utilize inputs from relative deflection/velocity sensors 106 and from foundation acceleration sensors 107 in a feedback loop to control actuator 103.

More specifically, isolation mount 102 may be a steel spring, an elastomeric spring, an air mount, magnetic levitation mount, etc. There is limited clearance between machine 101 and its foundation 104, requiring that maximum displacement between machine and foundation be controlled so as not to exceed a maximum value. The foundation (e.g. a hull of a ship) is subjected to acceleration 108, $a_H$, which results in relative deflection between machine and foundation that might exceed the available clearance. If the aforesaid maximum value is exceeded the available clearance might be exceeded and the gap between machine and foundation might be approach zero distance. If the gap reaches zero undesirable contact between machine and mount occurs with the potential for causing damage to either or both. Sensors 106 measure both deflection between machine 101 and its foundation 104 and the time derivative of the deflection, and sensors 107 measure acceleration of the foundation. That information from sensors 106 and 107 is sent to controller 105 which continuously computes the estimated time history of the relative displacement, assuming that the foundation acceleration remains constant. The computation function of controller 105 may be implemented by a digital computer or portion thereof, an example of which is discussed in more detail in connection with FIG. 9 hereinbelow. Such a computer can be obtained in the marketplace along with appropriate operating system software and appropriate applications software to enable the kinds of computations required by the mathematical equations presented herein. If any of the computations (discussed more fully hereinbelow) indicate that the relative displacement between machine and foundation will exceed available clearance, then controller 105 sends a signal to actuator 103 which adjusts the stiffness between machine and foundation to ensure that the maximum allowable deflection is not exceeded. Actuator 103 may be pneumatic, electrodynamic, electromagnetic, hydraulic etc. (If vibration isolation mount 102 is an air mount all that is required is a mechanism for injecting air into and extracting air from the mount—no separate actuator is required. More detail about an exemplary air mount embodiment is presented below.) As soon as the feedback-loop-generated and continuously-updated predictions of future displacement etc., indicate that the machine to foundation relative deflections will be less than the maximum allowable, controller 105 signals actuator 103 to reduce the stiffness. Controller 105 will continue to reduce the stiffness until the predictions indicate that the maximum relative deflection between machine 101 and foundation 104 exceeds the maximum allowable value or until a predetermined minimum value of stiffness is reached. If the stiffness is reduced to its minimum value, it will remain there until predictions once again indicate that predicted maximum deflection between machine and foundation shall exceed the maximum allowable. These performance characteristics are based on certain mathematical formulae which are presented hereinbelow.

Figure 2:
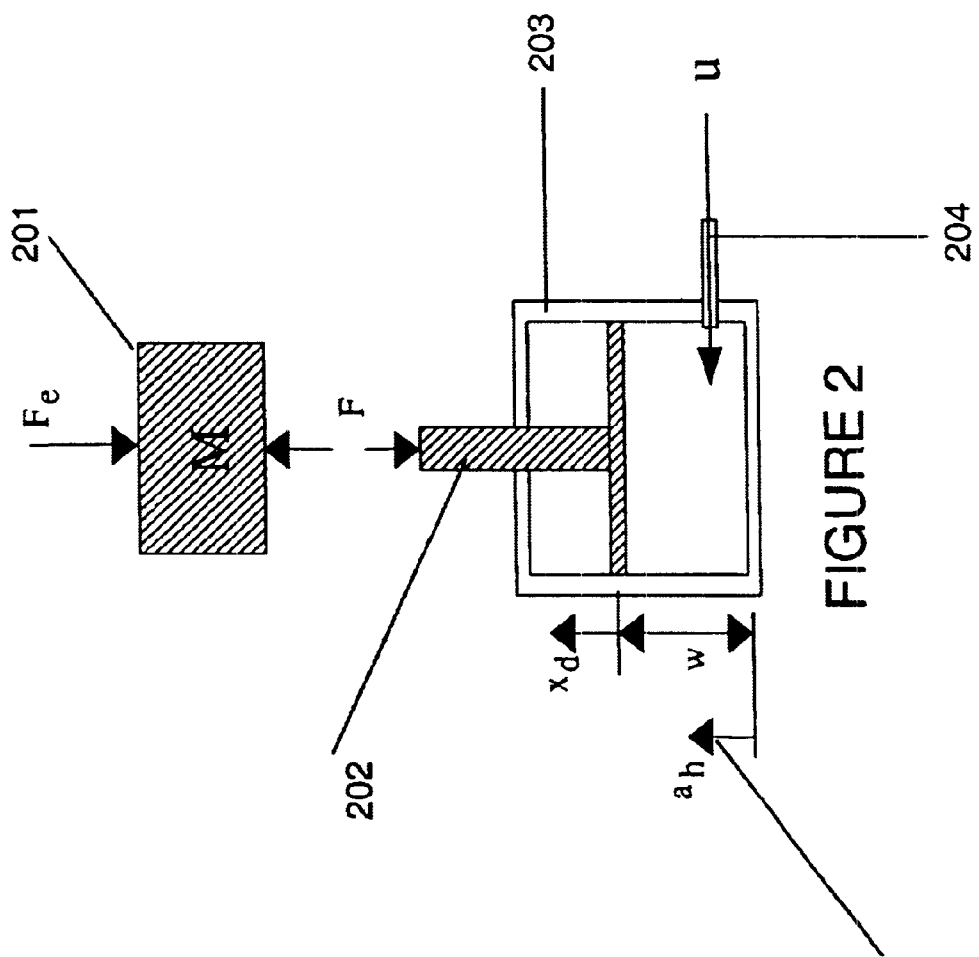
FIG. 2 is a schematic diagram of a pneumatic mount system suitable for use in the embodiment of FIG. 1.

Referring next to FIG. 2, consider application of the present invention within a pneumatic mount second order system. Foundation acceleration 205 is seen to drive the base of pneumatic mount 202, which results in relative displacement, w, between machine or deck mass M and foundation 203. The presumption is that there is a control system (not shown in this Fig.) that acquires inputs from sensors (not shown in this Fig.) measuring foundation acceleration $a_h$, the machine to foundation relative displacement xd and the machine to foundation relative velocity. If the foundation acceleration remains constant, these three pieces of information are sufficient to predict relative displacement between machine and foundation for all time.

Equations of Motion

The equations of motion for the system are given by $$\ddot{w} + \eta \omega_o \dot{w} + \omega_o^2 w = \frac{\omega_o^2}{S} u - \dot{a}_h \quad (1)$$

Where $a_h$ is the foundation acceleration, $\eta$ is the loss factor of the system, S is the cross sectional area of the air mount and $\omega_0$ is the natural frequency. If we assume that the control system provides a flow rate u at inlet 204 proportional to the relative velocity $\dot{w}$ such that $$u = \beta S \dot{w} \quad (2)$$

where $\beta$ is an arbitrary constant, Eq. 1 simplifies to $$\ddot{w} + \eta \omega_0 \dot{w} + \omega_0^2(1-\beta)\dot{w} = -\dot{a}_h$$

which upon integrating both sides of the equation further simplifies to $$\ddot{w} + \eta \omega_0 \dot{w} + \overline{\omega}_0^2 w = -a_h \quad (3)$$

where $\overline{\omega}_0 = \omega_0 \sqrt{(1-\beta)}$. Equation 3 shows that airflow in phase with the velocity across the mount will decrease the system natural frequency while that out of phase will increase it.

Compensation through Natural Frequency Adjustment

For a very lightly damped system the response to steady foundation acceleration is given, approximately, by $$w = w_o \cos(\overline{\omega}_o t + \phi) + \frac{a_h}{\overline{\omega}_o^2}$$

$$\dot{w} = -w_o \overline{\omega}_0 \sin(\overline{\omega}_o t + \phi)$$

where $w_0$ is a displacement amplitude and $\phi$ a phase angle each of which depends on the initial conditions when the foundation acceleration is applied. In these equations, effects of damping have been neglected in order to simplify this analysis and design. By neglecting damping, maximum excursion of machine or deck mass 201 relative to foundation 203 will be overestimated, thus giving a conservative estimate.

Rearranging the mathematical terms in the two equations, squaring both equations, and adding them together, we obtain $$\left(w - \frac{a_h}{\overline{\omega}_o^2}\right)^2 + \left(\frac{\dot{w}}{\overline{\omega}_o}\right)^2 = w_o^2 \quad (4)$$

In the phase plane with $\dot{w}/\overline{\omega}_0$ the ordinate and w the abscissa this is the equation of a circle of radius $w_0$ centered on $$\frac{a_h}{\overline{\omega}_o^2}.$$

In the w, $\dot{w}$ coordinates it is an ellipse.

Figure 3:
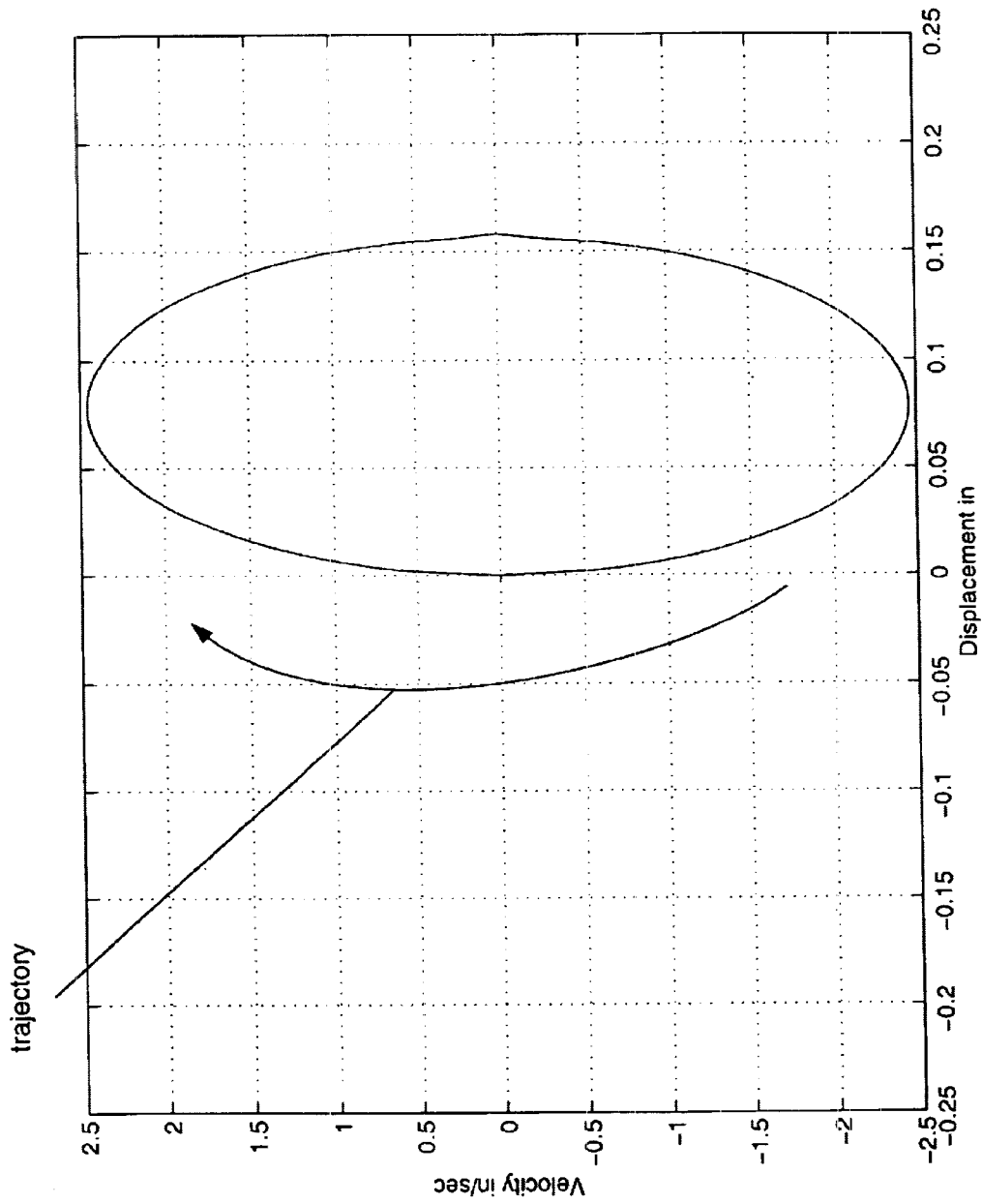
FIG. 3 is a computer-plot of velocity versus displacement showing performance characteristics of the present invention (showing trajectory of the operation of the present invention in the phase plane)

Referring next to FIG. 3 a computer plot of these equations governing the trajectory of, for example, a 5 Hz mounting system with 0.2 g step in foundation acceleration applied when machine 201 is in equilibrium with foundation 203 (when w and $\dot{w}$ are zero) is presented. The efficacy of the present invention is thus shown. The trajectory is clockwise around the ellipse and when damping is present will gradually decay to $\dot{w}=0$ and $$w = \frac{a_h}{\overline{\omega}_o^2}.$$

The maximum value of w occurs when $\dot{w}$ is zero. Consequently from Eq. 4 w is solved-for when $\dot{w}$ is zero to obtain $$w_{\max} = \pm w_o + \frac{a_h}{\overline{\omega}_o^2}.$$

Depending on the sign of the foundation acceleration, maximum relative displacement is given by $$w_{\max} = \frac{a_h}{\overline{\omega}_o^2} + w_o; \, a_h \geq 0 \quad (5a)$$

$$w_{\max} = \frac{a_h}{\overline{\omega}_o^2} - w_o; \, a_h \leq 0$$

and $w_0$ is given by $$w_o = \sqrt{\left(w(0) - \frac{a_h(0)}{\overline{\omega}_0^2}\right)^2 + \left(\frac{\dot{w}(0)}{\overline{\omega}_o}\right)^2} \quad (5b)$$

where w(0), $\dot{w}(0)$ and $a_h(0)$ are the displacement velocity and foundation acceleration at the instant of application of the foundation acceleration.

If the foundation acceleration is fixed the system natural frequency can be adjusted to ensure that maximum excursion of the machine relative to foundation remains within predefined bounds. If $w_{max}$ is the maximum allowable displacement of machine relative to foundation, Eq. 5a can be solved for natural frequency $\overline{\omega}_0$ and obtain $$\overline{\omega}_o = \sqrt{\left|\frac{a_h}{w_{max} - w_o}\right|}; a_h \geq 0 \qquad (6)$$

$$\overline{\omega}_o = \sqrt{\left|\frac{a_h}{w_{max} + w_o}\right|}; a_h \leq 0$$

where $w_0$ is the positive square root in Eq. 5b

Equation 6 does not include damping, but for a lightly damped system such equation is a reasonable approximation to the mount natural frequency necessary for controlling maximum excursion of machine relative to foundation. For systems with higher damping Eq. 6 may over-estimate the required natural frequency resulting in more stiffening than necessary to control maximum excursion.

Figure 4:
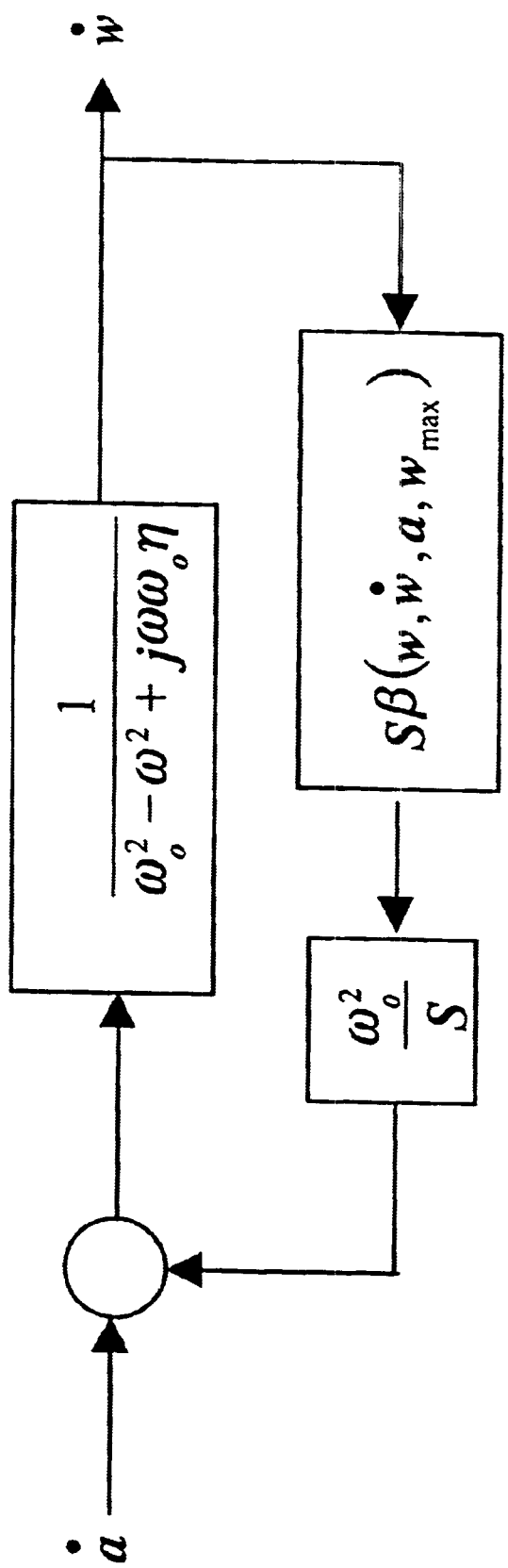
FIG. 4 is a block diagram of the dynamic feedback mechanism employed in the present invention showing an exemplary compensation-through-natural-frequency-adjustment algorithm.

Referring next to FIG. 4, a block diagram for the feedback system of the present invention is shown. Excitation input to the system is shown as the time derivative of the acceleration of the base of the mount. The resulting velocity across the mount is then fed back and a flow rate proportional to that velocity is injected into the mount. The proportionality factor β in the figure is a function of w, the displacement across the mount ẇ, the velocity across the mount a, the acceleration of the base of the mount and $w_{max}$, the maximum allowable mount displacement based on equations 5b and 6. The resulting controller (FIG. 1, controller 105) offers a great deal of flexibility in setting the output. Minimum and maximum natural frequencies can be set, displacement limits across the mount can be explicitly set, and displacement limits can be different in both plus and minus directions.

Simulations

To simulate the response of a system employing the above control concept Eq. 3 is expanded using the finite difference approach by expressing time derivatives as $$\dot{w} = \frac{w_{n+1} - w_n}{\Delta t} \text{ and } \ddot{w} = \frac{w_{n+2} - 2w_{n+1} + w_n}{(\Delta t)^2}$$

where the subscript refers to the time step and $\Delta t$ is the time interval. Substituting these expressions into Eq. 3 and solving for $w_{n+2}$ one obtains $$w_{n+2} = a_n(\Delta t)^2 + w_{n+1}(2 - \eta\overline{\omega}_0\Delta t) + w_n\{-1 + \eta\overline{\omega}_0\Delta t - (\overline{\omega}_0\Delta t)^2\} \qquad (7)$$

In order to use this equation the first two time steps are needed which are determined by initial conditions $$w_1 = w(0)$$

$$w_2 = \dot{w}(0)\Delta t + w(0) \qquad (8)$$

In simulations to follow, Eq. 7 with the initial conditions of Eq. 8 will be used to compute displacement of machine relative to foundation. At each time step Eq. 6 is used to determine minimum mount natural frequency to ensure that machine to foundation relative displacement will not exceed $w_{max}$.

As an example consider a mounting system with the following parameter values; S=0.785 ft², η=0.01;

$$f_0 = \frac{\omega_o}{2\pi} = 1 \text{ Hz};$$

$\Delta t$=0.0004 sec. Maximum Allowable Deflection: $w_{max}$=0.25 in. Initial Conditions: w(0)=0 in. ẇ(0)=0 in/sec Excitation:0.2-g step in foundation acceleration $a_h$ passed through a second order low pass filter with a cut off frequency of 0.5 Hz and a loss factor of 2.

Figure 5:
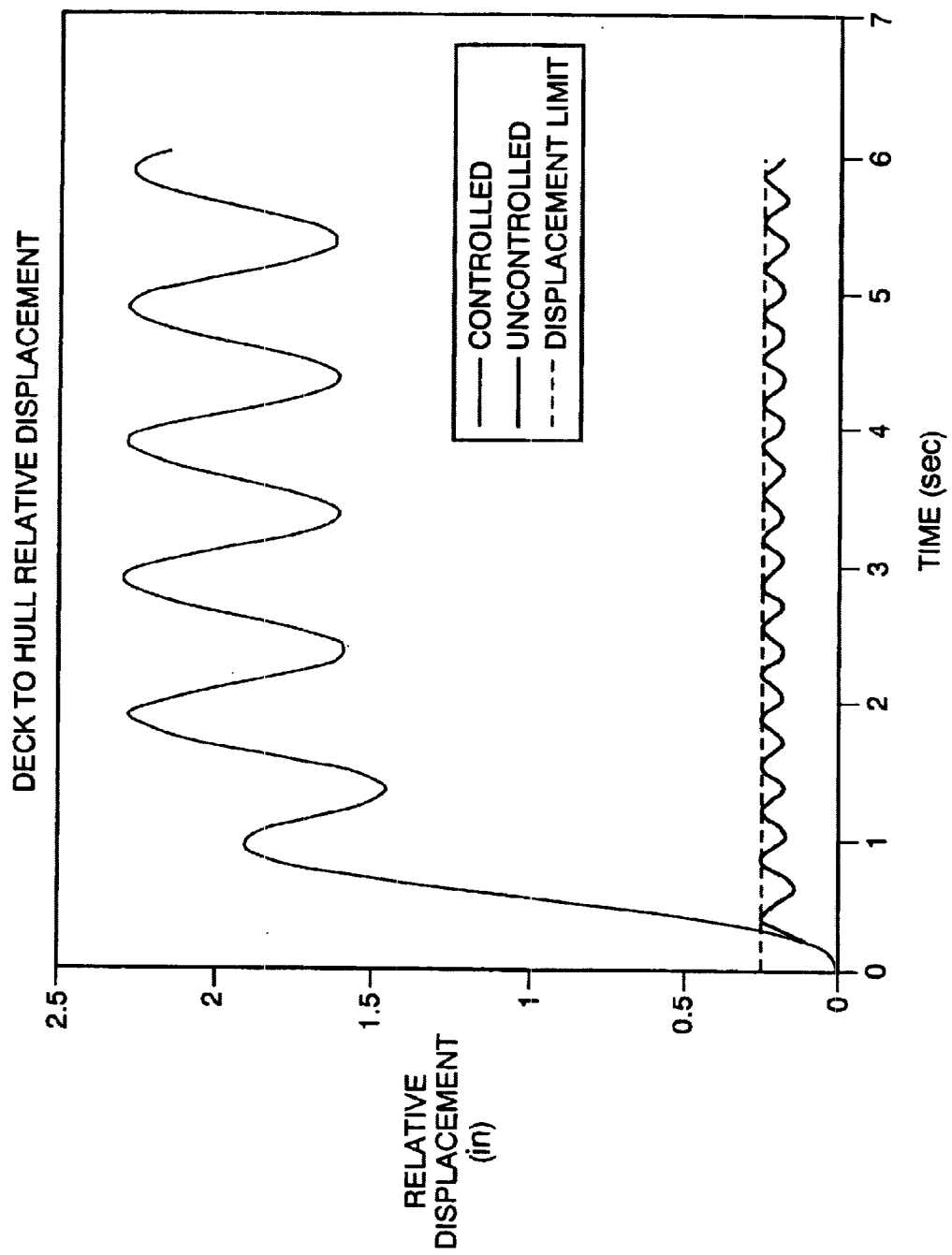
FIG. 5 is a computer-plot showing relative displacement versus time for controlled and uncontrolled mounts.

FIG. 5 shows the result in a computer line plot of relative deflection versus time. In this figure the uncontrolled system is allowed to exceed maximum allowable deflection. If allowed to do so it reaches a maximum relative deflection of approximately 2.25 in. The system is seen then to oscillate between 1.6 and 2.25 in deflection. The prolonged oscillation is a consequence of the very low loss factor assumed in the calculations, a loss factor, which was measured on an air mount being studied for possible shipboard use. The controlled mount in FIG. 5 stays below maximum allowable deflection as expected.

Figure 6:
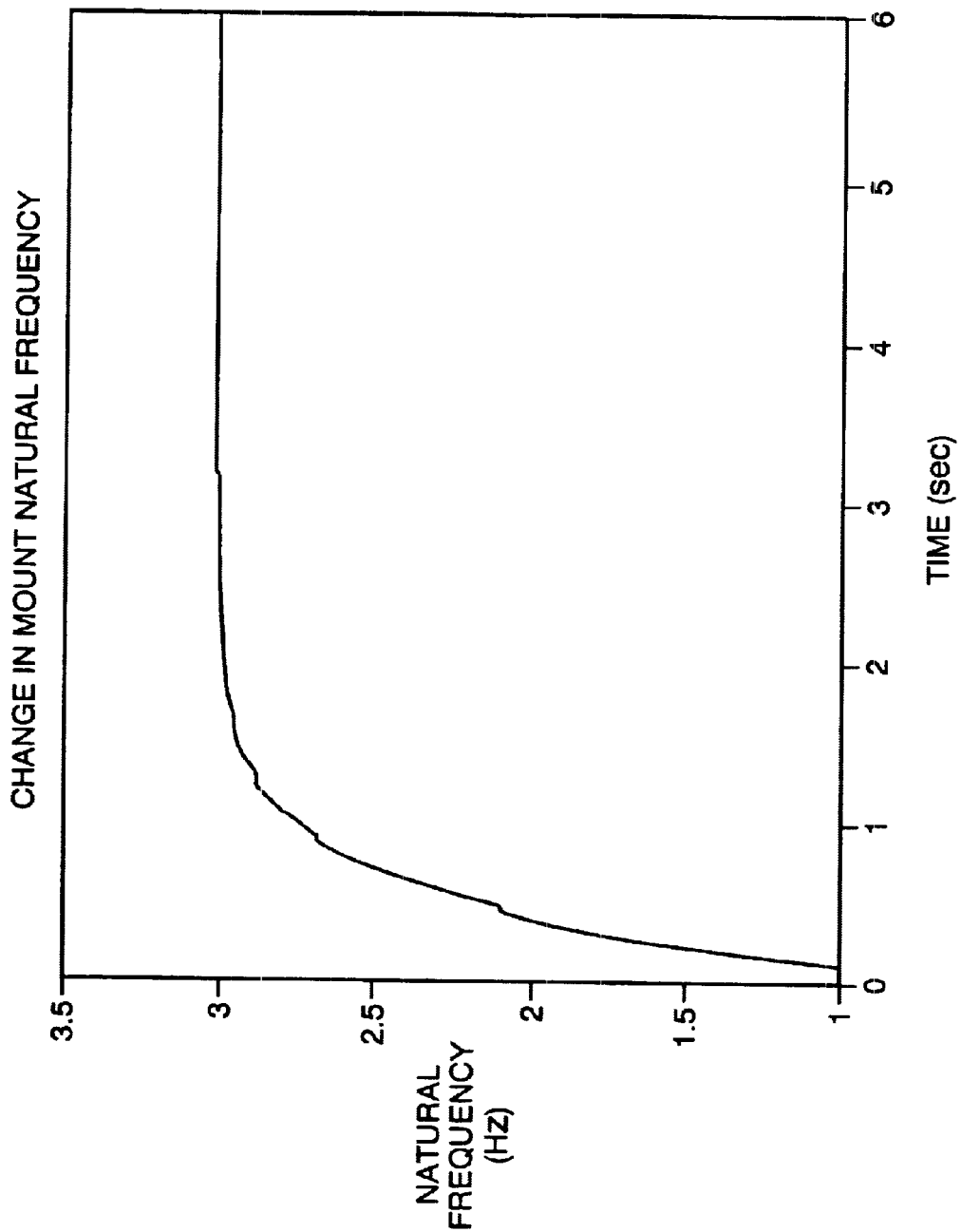
FIG. 6 is a computer-plot showing change in natural frequency for a 0.2 g step in acceleration.
Figure 7:
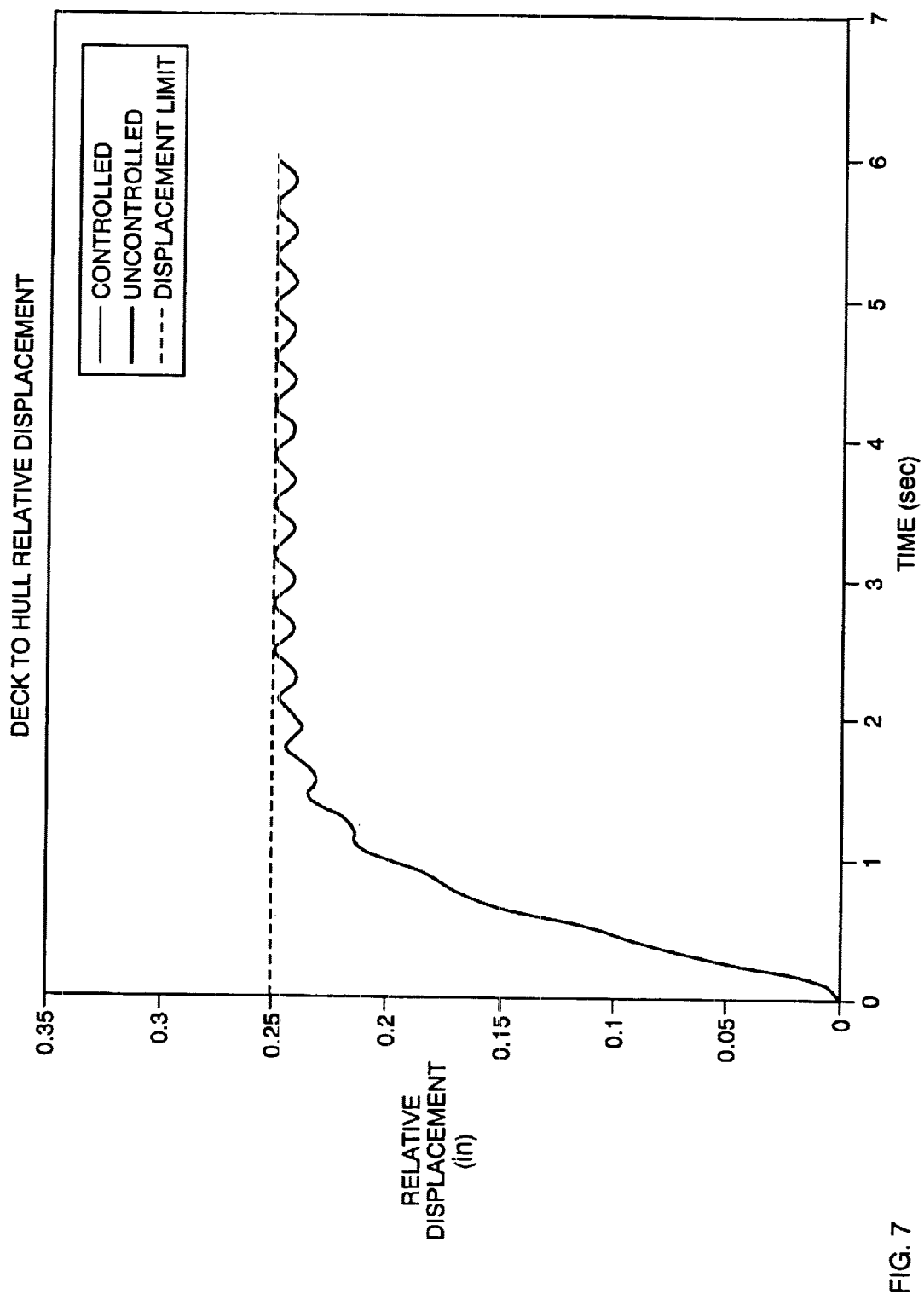
FIG. 7 is a computer-plot or computer-generated presentation showing relative displacement versus time for a 2.82 hz mount.

Referring to FIG. 6, the change in natural frequency in the controlled mount is shown. Mount natural frequency increases from 1 Hz to approximately 3 Hz in order to control relative deflection. By contrast if the mount were fixed at, for example, a 2.82 Hz mount all the time the deflection would be that shown in FIG. 7. The controlled and uncontrolled responses are nearly the same indicating that an uncontrolled mount with a natural frequency of 2.82 Hz would be sufficient to ensure that maximum allowable deflection would not be exceeded for this set of conditions. This stiffness is slightly less than the ~3 Hz final stiffness of the controlled mount. However, after the pulse is over the uncontrolled mount will remain at the higher stiffness of a 2.82 Hz mount, whereas the controlled mount will return to the stiffness of a 1 Hz mount. In addition the controlled mount has the flexibility of being able to deal with a variety of different and potentially larger foundation acceleration time histories and still maintain desired clearance between machine and foundation.

In the controlled mount flow rate into the mount is given in terms of β and relative velocity between machine and foundation, ẇ, by $$u = \beta S \dot{w}$$

where $$\beta = 1 - \left(\frac{\overline{\omega}_o}{\omega_o}\right)^2.$$

Figure 8:
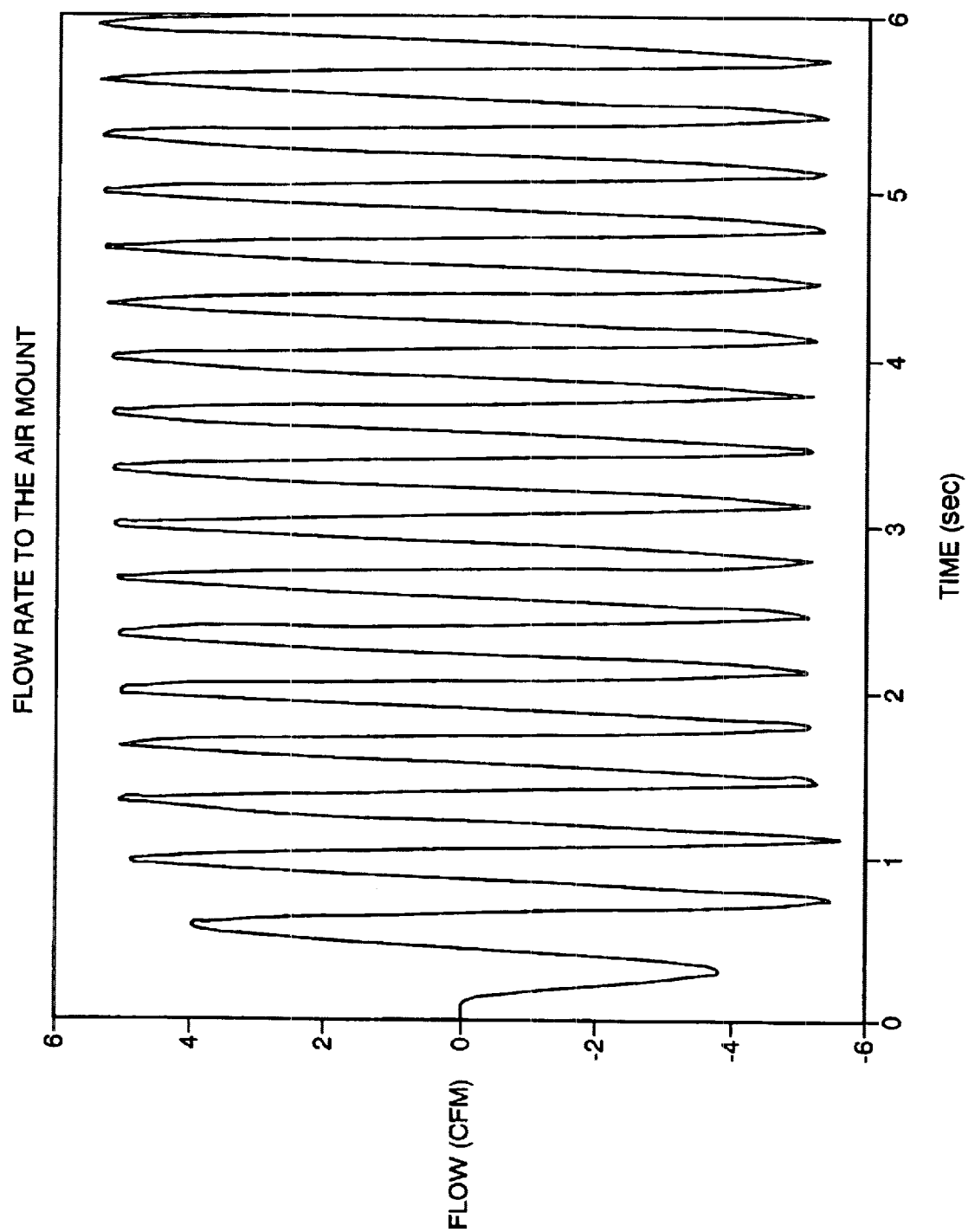
FIG. 8 is a computer-plot showing flow rate versus time in the controlled 1 hz mount needed to modify natural frequency; and, FIG. 9 is a schematic diagram of a generic computer system of the type that would be useful in making computations based on equations related to the feedback control operation of the present invention.

It is a straightforward matter to substitute velocity and modified natural frequency into the equation and obtain flow rate. The result of doing so for the 1 Hz controlled mount responding to the 0.2-g step is shown in FIG. 8. The flow rate has a peak of ~5 CFM. If the mount is operating at 400 psi it will require approximately 8.7 peak horsepower to generate the necessary flow rate. The flow rate and power will decrease significantly with increasing uncontrolled mount natural frequency.

Figure 9:
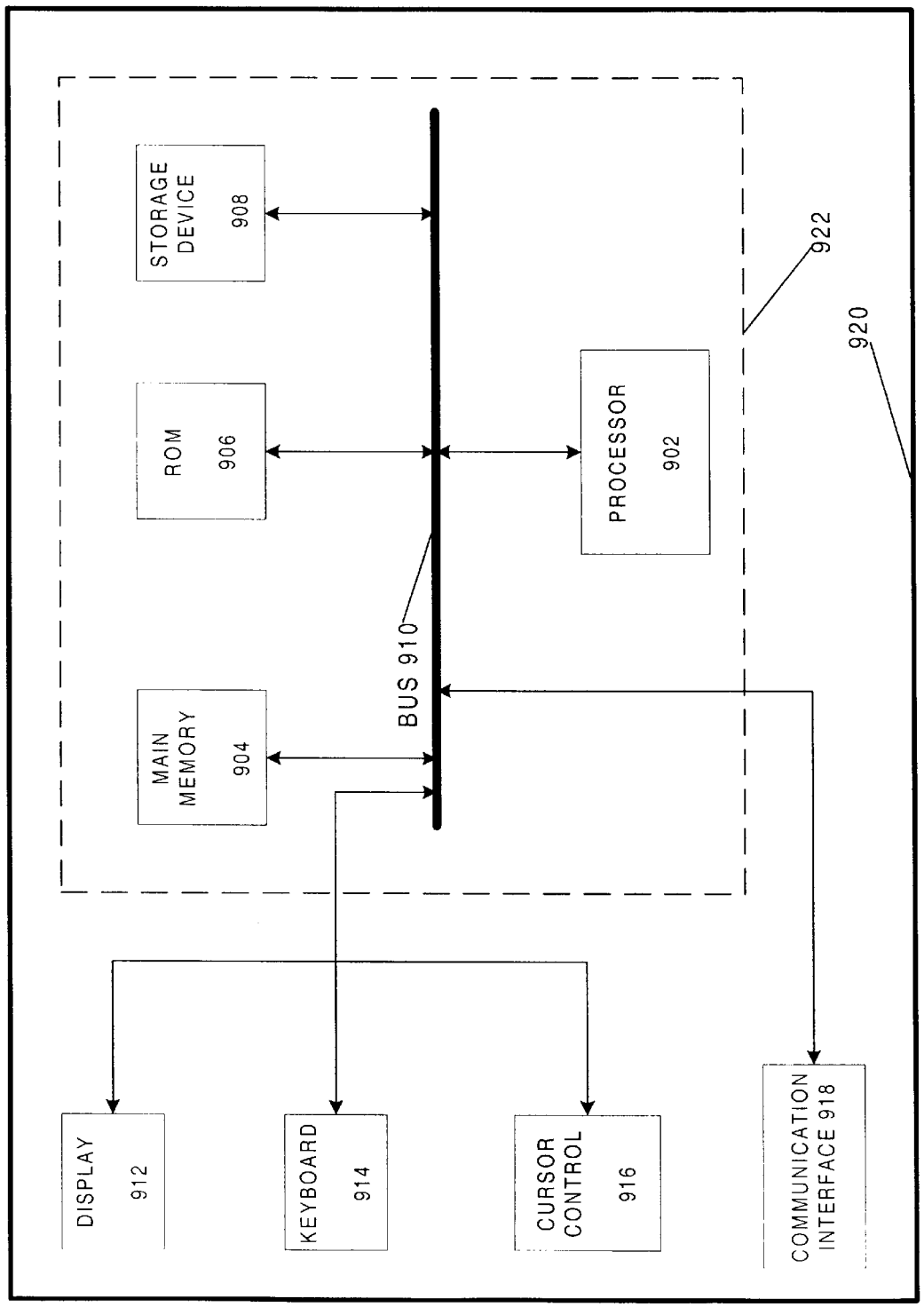

FIG. 9 is a block diagram of a computer system of the type that can be used with the present invention to make calculations based on the equations set forth hereinabove. Computer system 920 would be functionally located within controller block 105 of FIG. 1. Computer system 920 includes storage and processing subsystem 922 and a user interface subsystem identified by display 912, keyboard 914, cursor control 916, and communication interface 918. The user interface subsystem is the familiar terminal and keyboard with mouse and other communication devices (e.g. audio) and with which many technologists are proficient. The processing subsystem employs the following components: processor 902 to make the calculations required by the foregoing equations, main memory to store the equations and results of calculations performed in accordance therewith, read only memory (ROM) 906 for further specific memory applications and an auxiliary storage device 908 if it is needed. These components are interconnected through computer bus 910 whereby they can all communicate with each other; the bus is also connected to the user interface whereby the user can communicate with the computer system. Commercially available or custom interface components, not shown, can be used with the computer system to enhance its effectiveness in any particular application of the present invention; such interface components could include pressure sensors, A/D converters, D/A converters, amplifiers, filters, etc. It is to be understood that once the appropriate application software is loaded into the computer system which would be running on suitable operating system software, under ordinary conditions there should be little, if any, need for further human user-interface intervention in the ongoing operation of this computer system within the operation of the present invention.

The foregoing description of the embodiments of the present invention are not intended to limit its scope. Other alternative embodiments based on disclosed principles of the present invention are within the spirit of the present invention and are intended to be embraced within the appended claims herein.

What is claimed is:

1. A system for controlling motion of a first object movably mounted within a second object, comprising:

means for establishing stiffness of movably mounted structure supporting said first object;

means for establishing an allowable maximum range of motion of said first object relative to said second object;

means for continuously estimating maximum displacement of said first object relative to said second object; and, means, responsive to operation of said continuously estimating means estimating said maximum displacement to be beyond said allowable maximum range, for adjusting said stiffness in a manner to prevent said maximum displacement from exceeding said allowable maximum range of motion.

2. The system of claim 1 and wherein said first object is a ship's deck and the second object is a ship's hull.

3. The system of claim 2 and wherein said stiffness establishing means is a pneumatic system.

4. The system of claim 3 and wherein said allowable maximum range of motion excludes motion whereby said deck would otherwise make contact with said hull.

5. The system of claim 3 and wherein said maximum displacement estimating means includes hull acceleration sensors for measuring hull acceleration, relative displacement sensors for measuring said deck to said hull relative displacement, and relative velocity sensors to measure said deck to said hull relative velocity.

6. The system of claim 5 and wherein said stiffness adjusting means employs said acceleration, said relative displacement, said relative velocity, and said maximum range in a feedback loop control system to continuously calculate estimated values of said maximum displacement and to vary the pressure of said pneumatic system accordingly.

7. The system of claim 1 and wherein said stiffness adjusting means provides low stiffness under quiescent conditions.

8. The system of claim 1 and wherein said adjusting means is computer controlled.

9. A method for controlling motion of a first object movably mounted within a second object, comprising:

establishing stiffness of movably mounted structure supporting said first object;

establishing an allowable maximum range of motion of said first object relative to said second object;

continuously estimating maximum displacement of said first object relative to said second object; and, adjusting said stiffness, responsive to said continuously estimating maximum displacement being beyond said allowable maximum range, in a manner to prevent said maximum displacement from exceeding said allowable maximum range of motion.

10. The method of claim 9 and wherein said first object is a ship's deck and the second object is a ship's hull.

11. The method of claim 10 and wherein said stiffness establishing is pneumatic.

12. The method of claim 11 and wherein said allowable maximum range of motion excludes motion whereby said deck would otherwise make contact with said hull.

13. The method of claim 11 and wherein said maximum displacement estimating includes hull acceleration sensors for measuring hull acceleration, relative displacement sensors for measuring said deck to said hull relative displacement, and relative velocity sensors to measure said deck to said hull relative velocity.

14. The method of claim 13 and wherein said stiffness adjusting employs said acceleration, said relative displacement, said relative velocity, and said maximum range in feedback loop control to continuously calculate estimated values of said maximum displacement and to vary the pneumatic pressure accordingly.

15. The method of claim 9 and wherein said stiffness adjusting provides low stiffness under quiescent conditions.

16. The method of claim 9 and wherein said adjusting is computer controlled.

* * * * *